United States Patent

Nakamura (10) Patent No.: US 6,594,200 B2
(45) Date of Patent: Jul. 15, 2003

(54) SYNTHETIC APERTURE SONAR AND SYNTHETIC APERTURE PROCESSING METHOD

(75) Inventor: Yoshiyuki Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/046,266

(22) Filed: Jan. 16, 2002

(65) Prior Publication Data

US 2002/0093880 A1 Jul. 18, 2002

(30) Foreign Application Priority Data

Jan. 17, 2001 (JP) ............................ 2001-008367

(51) Int. Cl.[7] ............................................. G01S 15/89
(52) U.S. Cl. ............................................ 367/88
(58) Field of Search ............................ 367/88; 342/25

(56) References Cited

U.S. PATENT DOCUMENTS

| | | | |
|---|---|---|---|
| 4,244,036 A | | 1/1981 | Raven |
| 4,953,143 A | * | 8/1990 | Higgins et al. ............ 367/88 |
| 5,546,357 A | * | 8/1996 | Zehner ..................... 367/88 |
| 5,802,012 A | | 9/1998 | Yamaguchi ................ 367/88 |
| 5,886,950 A | * | 3/1999 | Billon ...................... 367/88 |

FOREIGN PATENT DOCUMENTS

| | | |
|---|---|---|
| JP | 3-218485 | 9/1991 |
| JP | 9-264959 | 10/1997 |
| JP | 2803658 | 7/1998 |
| JP | 11-337639 | 12/1999 |
| JP | 11-344565 | 12/1999 |

OTHER PUBLICATIONS

Lawlor, M.A. et al. "Further Results from the SAMI synthetic Aperture Sonar," *Oceans 96 MTS/IEEE Conference Proceedings* (Sep. 23–26, 1996), pp. 545–550.

\* cited by examiner

*Primary Examiner*—Ian J. Lobo
(74) *Attorney, Agent, or Firm*—Foley & Lardner (57) ABSTRACT

The present invention provides a method of being able to perform fluctuation correction processing, and to accelerate a traveling speed, without reducing a range and spatial resolution. An actual aperture array is divided into two verniers, and respective verniers simultaneously transmit transmission signals having waveforms different from each other. A waveform separable by reception processing is selected and used as a transmission waveform. It is possible to increase space-sampling points obtained by one ping by separating an acoustic signal received in each vernier. With using this method, overlap points that are phase-equivalent even if a sonar travels at an usual speed are generated, and fluctuations between pings are detected and corrected by an overlap method. Consequently, it is possible to realize a synthetic aperture sonar with high resolution that can perform fluctuation correction by the overlap method with traveling at the usual speed.

16 Claims, 12 Drawing Sheets

THREE-POINT SAMPLING PER ping

OVERLAP POINT OF pings 2 AND 3
(CORRECTION OF PHASE AND FLUCTUATION)

Up-Chirp SIGNAL

FIG. 7B

Down-Chirp SIGNAL

SYNTHETIC APERTURE SONAR AND SYNTHETIC APERTURE PROCESSING METHOD

BACKGROUND OF THE INVENTION

1. Field of the Invention

The present invention relates to a synthetic aperture sonar and a synthetic aperture processing method, and in particular, to a synthetic aperture sonar using an actual aperture array division and transmission and reception multiplexing method, and a synthetic aperture processing method for accelerating a traveling speed.

2. Description of the Related Art

Synthetic aperture radars (SAR) are used in artificial satellites and aircrafts as radar systems with high spatial resolution. What synthetic aperture processing is applied to a sonar on the basis of the same principle as this radar is a synthetic aperture sonar (SAS).

Figure 8:
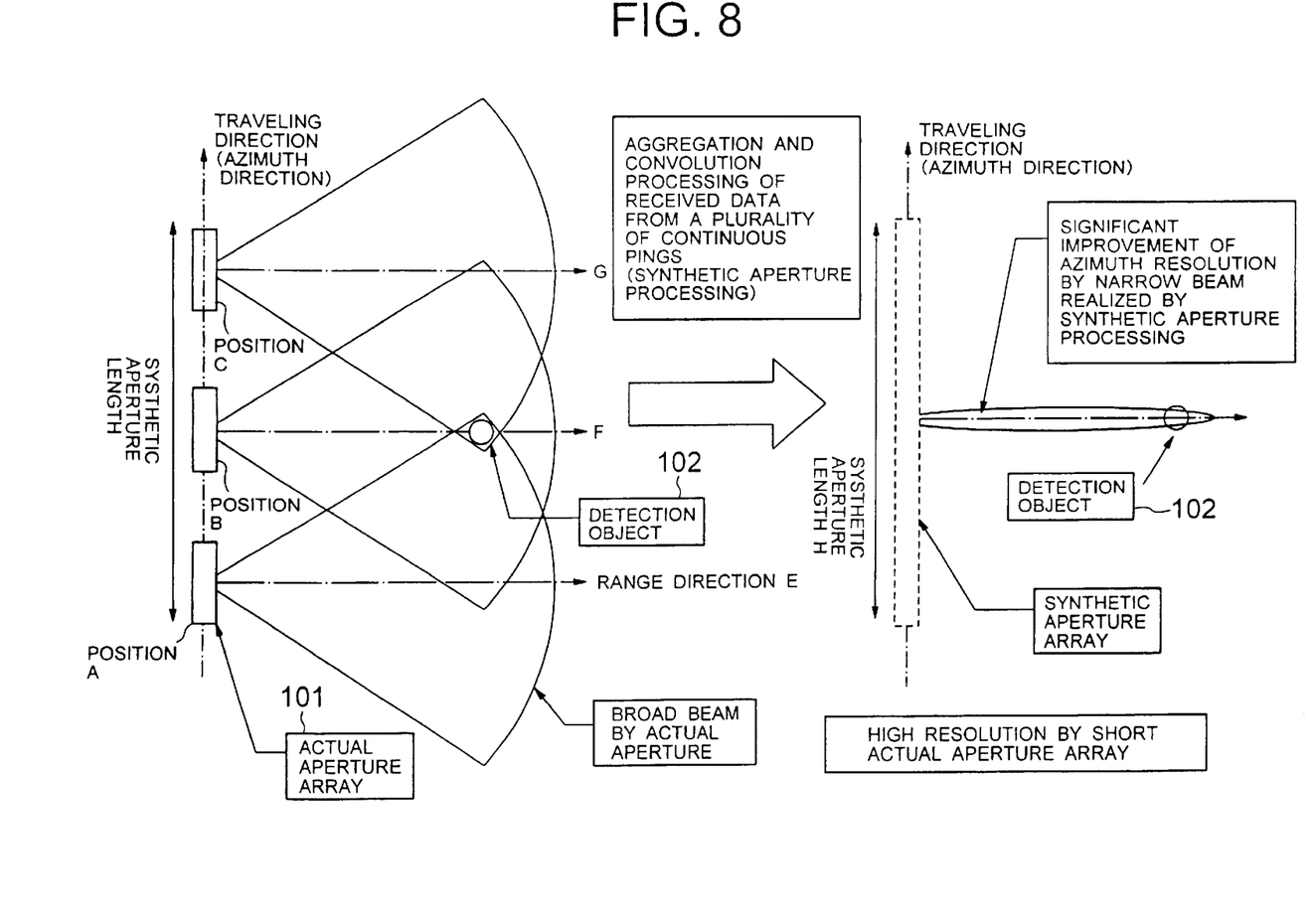
FIG. 8 is an explanatory diagram of the basic principle of a synthetic aperture sonar.

FIG. 8 is an explanatory diagram of the basic principle of a Strip-Map Type synthetic aperture sonar. With referring to this figure, it is assumed that an actual aperture array 101 travels in the direction of the upper part (an azimuth direction) from a lower part of this figure. First, a first transmission and reception of a signal is performed in the direction E of a detection target (a range direction) at a position A, and next, a next transmission and reception of a signal is performed at a point where the sonar travels a half of actual aperture array length. This transmission and reception of a signal is totally performed N times continuously until the sonar reaches a position C through a position B. At this time, a detection target 102 is always included in an emission range of each beam in N-time transmission and reception. Then, by collecting this N-time received data, and performing synthetic aperture processing (convolution processing), it is possible to obtain the same resolution as the resolution obtained when one-time transmission and reception is performed in an aperture length (synthetic aperture length) H longer than that of the actual aperture array 101. This is the basic principle of a synthetic aperture sonar.

Although there are several methods also in synthetic aperture processing, here, an object is a Strip-Map type synthetic aperture sonar that is most common.

The Strip-Map type synthesis aperture sonar can be recognized as means for improving the azimuth resolution of a side-scan sonar (SSS) that has been used until now. The side-scan sonar generates a two-dimensional map of sound reflective intensity of a submarine surface by traveling with continuously performing sound transmission and reception. The resolution in a range direction (range resolution) of this submarine surface map is proportional to pulse length when PCW (Pulse Continuous Wave) is used for transmission and reception signals, or to frequency bandwidth when a wide band signal like LFM (Linear Frequency Modulation) is used. Moreover, angular resolution is determined by the width of a beam that an echo sounder transducer array forms. That is, angular resolution is proportional to an actual aperture length or a center frequency of the sonar.

On the other hand, a synthetic aperture sonar is a method for obtaining angular resolution (or an azimuth resolution) higher than a usual SSS by generating a long virtual array (synthetic aperture array) with using a plurality of continuous transmission and reception signals as described above. Usually, the synthetic aperture sonar performs the processing of changing the length of a synthetic aperture array in proportion to a range. Consequently, on the submarine map obtained, spatial resolution in the azimuth direction (azimuth resolution) becomes constant regardless of the range. This azimuth resolution is restricted to D/2, that is, a half of actual aperture array length D from grating lobe suppression conditions. This just means that a space-sampling period becomes D/2, and the spatial resolution obtained as the result of performing synthetic aperture processing is also restricted to D/2 or less.

Moreover, letting the maximum range be R, the traveling speed V is restricted as follows:

$$i\ V \leq (D/2)(c/2R) \qquad (1)$$

Here, item c denotes a underwater acoustic velocity. Although this trade-off condition of V and R can be also applied to a radar, the traveling speed, range, and resolution are restricted severely in comparison with the radar in a sonar due to the slowness of the underwater acoustic velocity c.

Several methods that improve implementation efficiencies of sonars with exceeding this trade-off restrictions are proposed. For example, there are a vernier division method (M. A. Lawlor et al., "Further results from the SAMI synthetic aperture sonar", IEEE OCEANS'96, 1996, Vol. 2, pp 545–550), a Japanese Patent Laid-Open No. 10-142333, etc. Each of these methods performs a plurality of space sampling by one-time transmission and reception, and uses an actual aperture array by dividing the actual aperture array. The azimuth resolution improves in proportion to this number of divisions, and it is not necessary to make the traveling speed slow.

Figure 9:
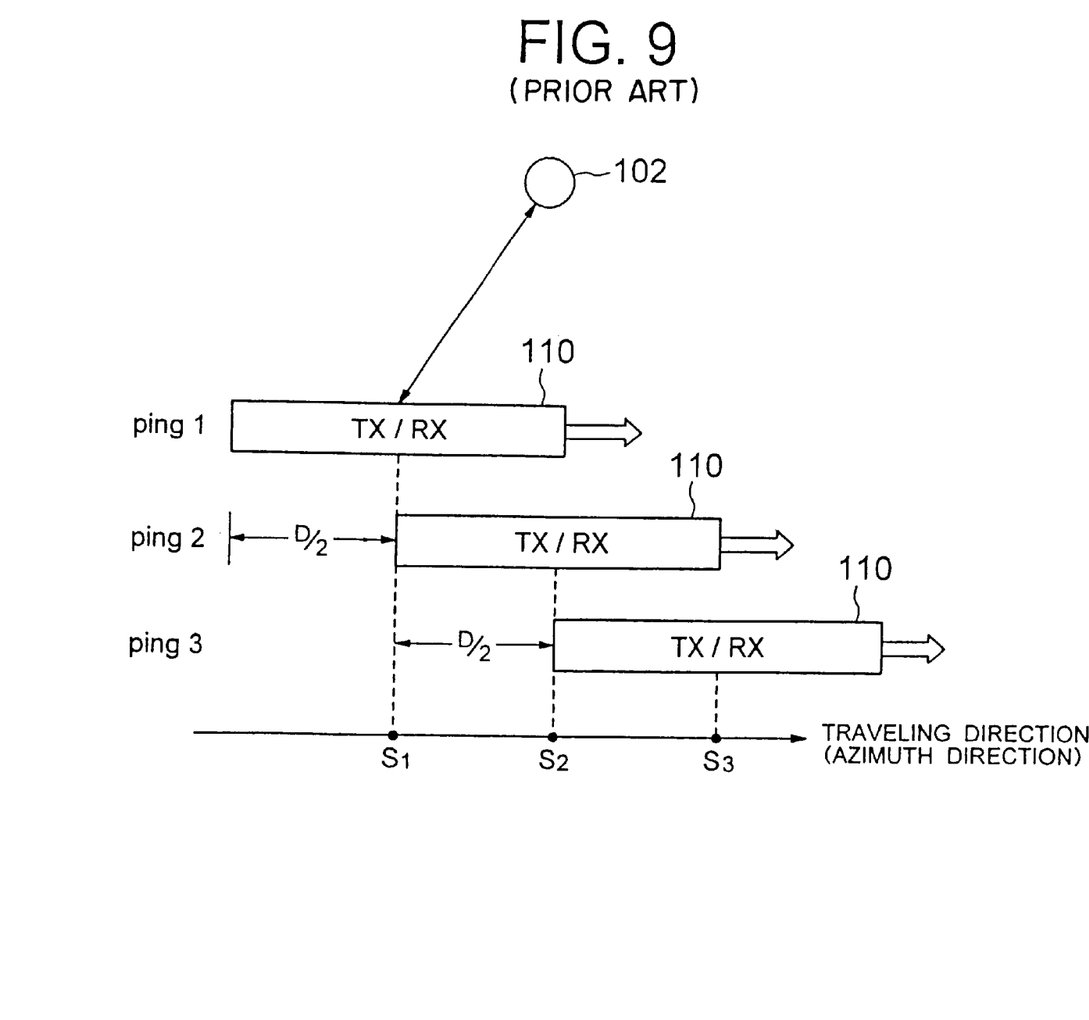
FIG. 9 is an explanatory diagram of the basic principle of a conventional synthetic aperture method.
Figure 10:
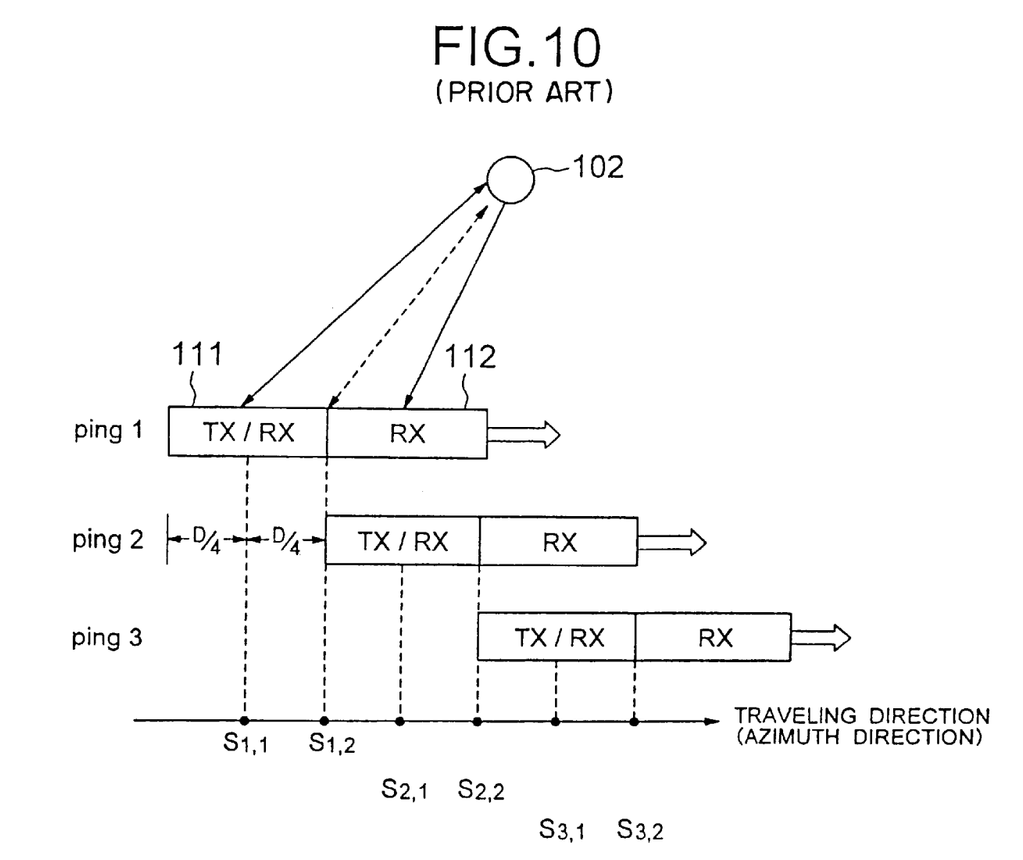
FIG. 10 is an explanatory diagram of the basic principle of a two-vernier division method of dividing a conventional actual aperture array into two.

Here, an example of the vernier division method will be described with referring to FIGS. 9 and 10. Although the method in FIG. 9 is a usual synthetic aperture method, the method in FIG. 10 is a two-vernier division method where the actual aperture array is divided into two pieces. First, the usual synthetic aperture method will be described.

With referring to FIG. 9, in ping 1, a first transmission of a signal is first performed from an array 110 with a length D to the detection target 102 at an azimuth position S1, and receives a reflected (echo) signal from the detection target 102. Next, in ping 2, a second transmission of a signal is performed from the vernier 110 to the detection target 102 at a position (azimuth position S2) where the sonar travels D/2 from the ping 1, and receives a reflected signal from the detection target 102. Next, in ping 3, a third transmission of a signal is performed from the vernier 110 to the detection target 102 at a position (azimuth position S3) where the sonar travels D/2 from the ping 2, and receives a reflected signal from the detection target 102. This transmission and reception is repeated N times continuously, and synthetic aperture processing is performed on the basis of N-time input signals. In this manner, since transmission and reception is performed in one ping with the sonar traveling D/2, azimuth resolution RES becomes D/2 and a speed V of the array 110 becomes PRF·D/2. Moreover, since transmission and reception is performed with using a whole array, it is not possible to define a phase-equivalent overlap point, and hence it is difficult to correct fluctuation with the overlap method.

Next, the two-vernier division method where an actual aperture array is divided into two pieces will be described. With referring to FIG. 10, the array 110 in FIG. 9 is divided into two pieces in the two-vernier division method in FIG. 10, and hence, an array consists of a rear vernier 111 and a front vernier 112. Then, the rear vernier 111 (a sub array with a length of D/2) transmits a signal, and both the rear vernier 111 and the front vernier 112 receive a reflected signal from the detection target 102. At this time, an input signal of the rear vernier 111 is equal to a transmission and reception signal at an azimuth position S1,1 (a position where the sonar travels D/4 forward from a backmost portion of the rear vernier 111). In addition, an input signal of the front vernier 112 is equal to a transmission and reception signal at an azimuth position S1,2 (a position where the sonar travels D/4 forward from the azimuth position S1,1). This relation is called a Displaced Phase Center. Since the azimuth resolution RES becomes twice as many as a usual method, that is, D/4 by performing this transmission and reception whenever the sonar travels D/2, the speed V of the array 110 becomes PRF·D/2 similarly to the usual method. Moreover, it is not possible to define a phase-equivalent overlap point, and hence it is also difficult to correct fluctuation with the overlap method. In addition, an example of the method of dividing and using an actual aperture array is also disclosed in Japanese Patent No. 2803658.

Figure 11:
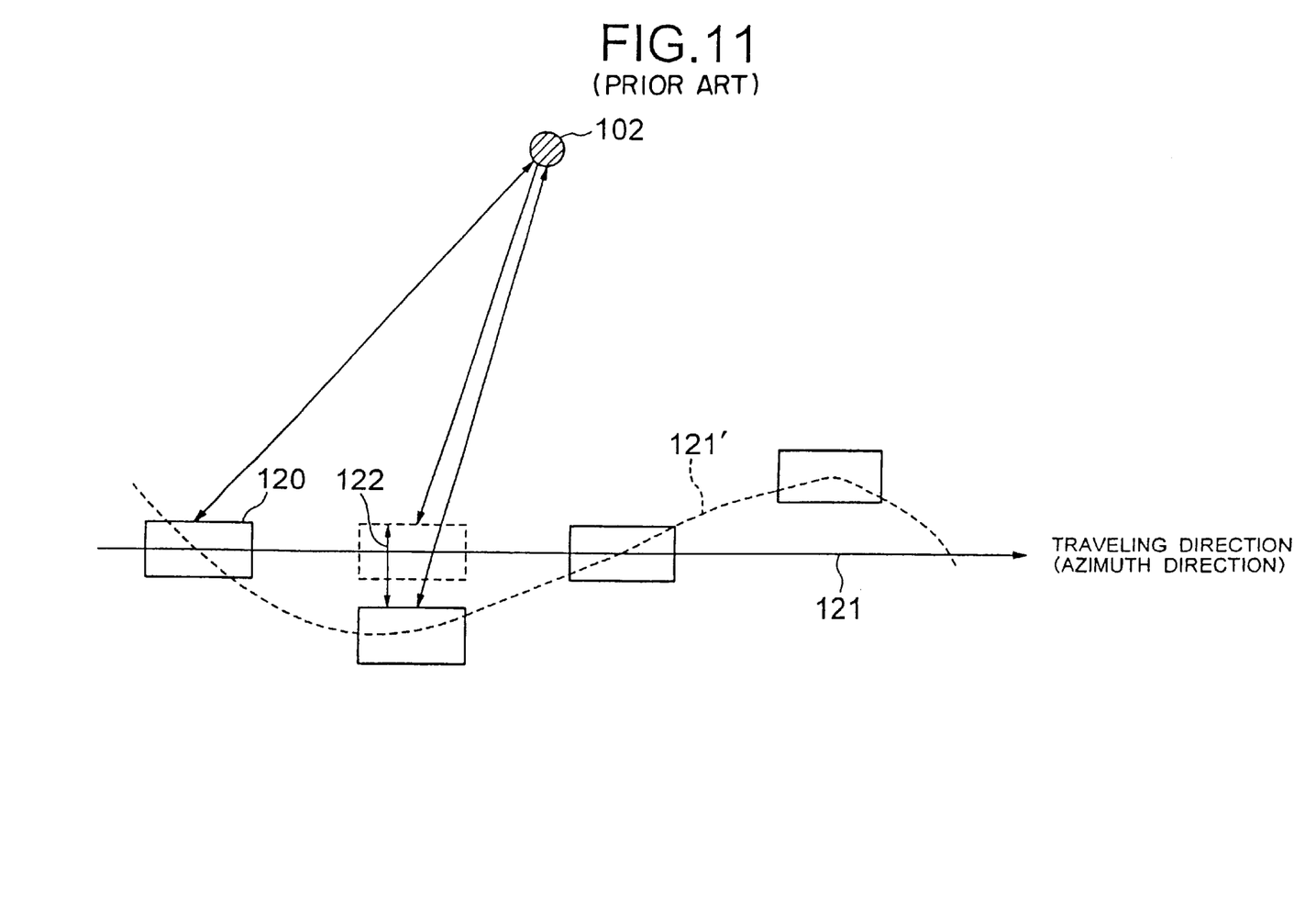
FIG. 11 is an explanatory diagram of fluctuations of a sonar.

On the other hand, a technical subject of a synthetic aperture sonar is what is weak in fluctuation of a sonar. FIG. 11 is an explanatory diagram of fluctuation of a sonar. This figure shows a case where a sonar 120 travels from the left-hand side in this figure to the right-hand side. The sonar 120 travels on a straight-line locus 121 ideally. However, the sonar 120, namely, a sonar platform such as a towed object, which is towed in underwater, or a sailing object that is self-propelled does not always travel on the ideal straight-line locus 121. Since fluctuating the influence of fluid turbulence or a tidal current, the sonar 120 travels on a curve as shown by a curve 121' in fact.

Since time interval between transmission and reception is long in comparison with a radar in the synthetic aperture sonar having the acoustic velocity slow in underwater, a deviation amount 122 also becomes large. Consequently, the synthetic aperture array of SAS is distorted remarkably, and hence, an ideal beam synthesis cannot be performed for resolution to deteriorate. Since the brittleness against fluctuation is a very severe problem, letting the wave length of a center frequency be $\lambda$, an image deteriorates even if the fluctuation is about 10% of $\lambda$. Since this is equivalent to the fluctuation of about 1.5 cm even if the sonar is a low frequency sonar with a frequency of about 10 kHz, it is difficult to measure this at sufficient accuracy even if a present high-precision acceleration sensor is used.

In order to correct the fluctuation, various kinds of post processing called Auto-focusing is used in SAR. The basic principle of the Auto-focusing is a method of searching in inverse operation for a phase correction term with which a synthetic aperture image, whose resolution is deteriorated because of including the fluctuation (defocused), may be focused.

However, it is a precondition for this method that a "focused image" is known in foresight. For example, in SAR, an artificial structure such as a building and a street partition may serve as a guideline of focusing, and a method of arranging a strong radio wave scattering object in a mapping region beforehand may be used. In SAR mainly for ground information, such a method is applicable and effective.

On the other hand, generally, the presence of such an artificial structure is not expectable to the submarine surface information that SAS treats, and hence, a focused state cannot be predicted beforehand. In addition, a method of arranging an artificial acoustic wave scatterer beforehand is also conceivable. However, since an area of a map obtained by one sailing by a sonar with a slow acoustic velocity is very narrow, a sea bottom will become full of scatterers when a large area is mapped.

From such a background, approaches to the fluctuation correction, which is different from those of SAR, in SAS has been studied. A most typical method is a method of sequentially obtaining the fluctuation deviation amount between pings from an input signal in an overlap part by partially overlapping an actual aperture array every transmission and reception (R. S. Raven, "Electronic Stabilization for Displaced phase Center System", U.S. Pat. No. 4,244,036 January 1981).

In consideration of the application to the above-described vernier division method, a method of traveling with making one of a plurality of space sampling points obtained by a vernier overlap is conceivable. Letting this method be a vernier overlap method, its outline is shown in FIG. 12.

Figure 12:
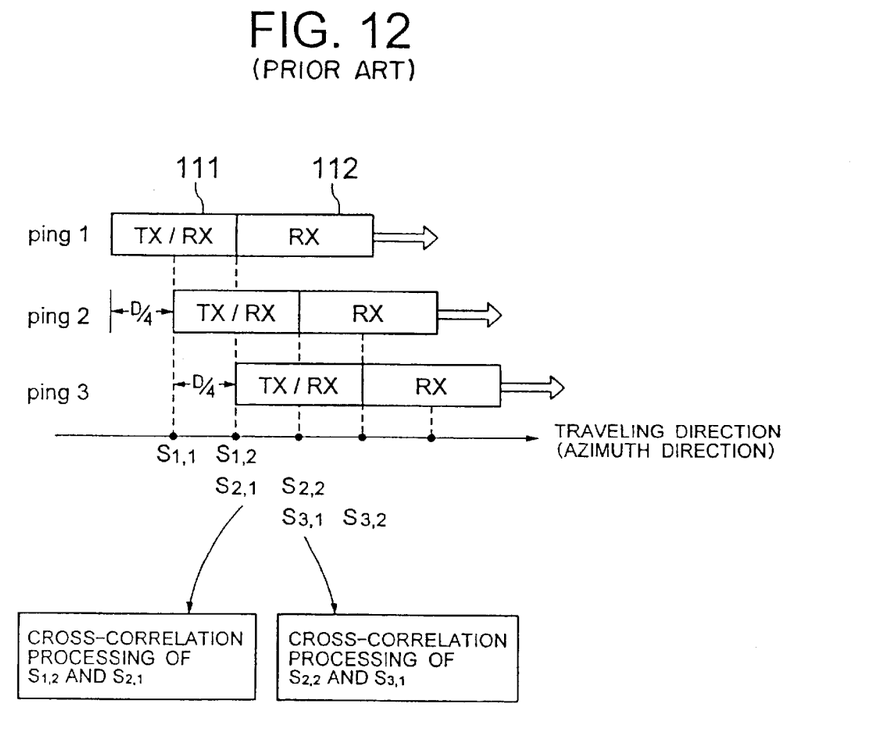
FIG. 12 is an explanatory diagram of the basic principle of a conventional vernier overlap method.

With referring to FIG. 12, the structure of the array in the vernier overlap method is the same as that of the above-mentioned two-vernier division method (refer to FIG. 10), and hence, the same numbers as those are assigned and explanation of them will be omitted. In the vernier overlap method, a sonar travels D/4 every ping, and transmission and reception is performed.

Namely, first, a transmission and reception signal is obtained at azimuth positions S1, 1, and S1, 2 in ping 1. Next, a transmission and reception signal is obtained at azimuth positions S2, 1, and S2, 2 in ping 2 where the sonar travels D/4 from this ping 1. Therefore, the transmission and reception signal at the azimuth position S1, 2 in ping 1, and the transmission and reception signal at the azimuth position S2, 1 in ping 2 become transmission and reception signals in the same azimuth position. Hence, a deviation amount by a fluctuation amount is detectable by performing the cross correlation processing of these two transmission and reception signals, and hence, it becomes possible to correct fluctuation.

Figure 13A:
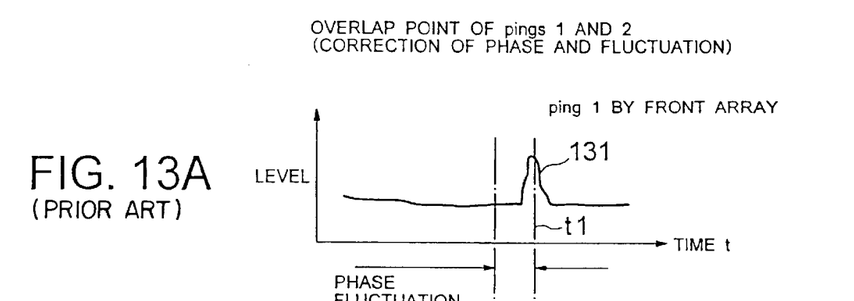
FIGS. 13A and 13B are explanatory diagrams of phase and fluctuation correction at an overlap point of pings 1 and 2.
Figure 13B:
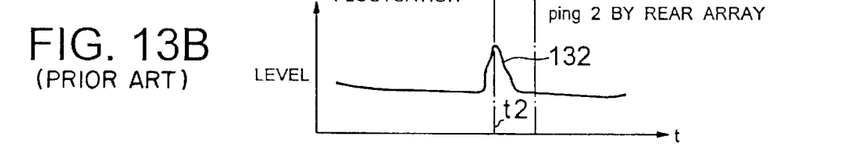

FIGS. 13A and 13B are explanatory diagrams of phase and fluctuation correction at an overlap point of pings 1 and 2. FIG. 13A shows reception time t1 of the signal 131 by the front array (vernier) 112 in ping 1, and FIG. 13B shows reception time t2 of the signal 132 by the rear array (vernier) 111 in ping 2. Since phase fluctuation is there between pings 1 and 2, reception time t1 and t2 does not coincide. Then, time delay and phase fluctuation are computed by taking cross correlation between the input signal 131 by the front array 112 and the input signal 132 by the rear array 111, and the fluctuation correction is performed.

Similarly, the transmission and reception signal at the azimuth position S2,2 in ping 2, and the transmission and reception signal at the azimuth position S3, 1 in ping 3 become transmission and reception signals in the same azimuth position. Hence, a deviation amount by a fluctuation amount is detectable by performing the cross correlation processing of these two transmission and reception signals, and hence, it becomes possible to correct fluctuation.

Figure 14A:
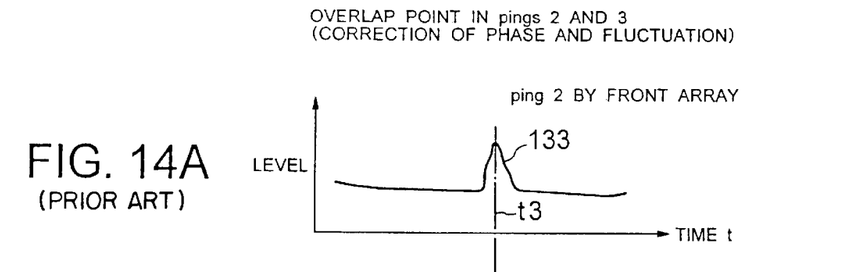
FIGS. 14A and 14B are explanatory diagrams of phase and fluctuation correction at an overlap point of pings 2 and 3.
Figure 14B:
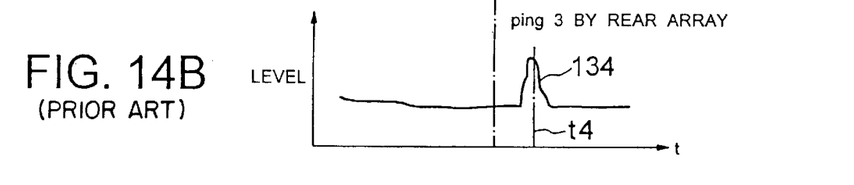

FIGS. 14A and 14B are explanatory diagrams of phase and fluctuation correction at an overlap point of pings 2 and 3. FIG. 14A shows reception time t3 of a signal 133 by the front array 112 in ping 2, and FIG. 14B shows reception time t4 of a signal 134 by the rear array 111 in ping 2. Since fluctuation is also there between pings 2 and 3, reception time t3 and t4 does not coincide. Then, time delay and phase fluctuation are computed by taking cross correlation between the input signal by the front array 112 and the input signal 134 by the rear array 111, and fluctuation correction is performed.

As apparent from the figure, the high resolution of D/4 and a fluctuation correction function are simultaneously realizable in the vernier overlap method. However, since space-sampling points are made to overlap, the sonar can travel only D/4 per ping. Namely, in the vernier overlap method, unless a range is shortening or the actual aperture length D is lengthened, only a half of the usual traveling speed will be obtained.

That is, a method in FIG. 12 is a method of applying the overlap fluctuation correction to the two-vernier division processing. Although azimuth resolution is twice as usual and fluctuation correction becomes possible, speed falls to a half of the usual speed since it is necessary to defining a phase-equivalent overlap point.

In addition, other examples of methods of each making an actual aperture array overlap to correct fluctuations are disclosed in Japanese Patent Laid-Open No. 3-218485, Japanese Patent Laid-Open No. 9-264959, Japanese Patent Laid-Open No. 11-337639, and Japanese Patent Laid-Open No. 11-344565.

A first problem is that a synthetic aperture sonar that performs fluctuation correction according to an overlap method is a slow traveling speed. That is because traveling distance per one-time transmission and reception becomes short in comparison with a usual case without overlapping since the sonar travels with making the actual aperture array overlap partially.

A second problem is a point that a range becomes short when a traveling speed is made to increase. That is because it is necessary to make R small in order to make V large as shown by the trade-off in formula (1). If V and R have an inverse proportion relation, area effectiveness will not be improved.

A third problem is a point that an actual aperture array is enlarged and hence spatial resolution falls, when a traveling speed is made to increase. That is because it is necessary to make D/2 large in order to make V large as shown by the trade-off in formula (1). Here, while being the length of an actual aperture array in the longitudinal direction, item (D/2) expresses azimuth spatial resolution. Enlargement of the actual aperture array decreases the employment property of a system remarkably, and deterioration of the spatial resolution means quality degradation of a map image obtained.

A fourth problem is a point the fluctuation correction processing by the overlap method becomes impossible when the traveling speed is increased. That is because the fluctuation deviation amount between pings is undetectable since an overlap part is not generated by the actual aperture array when traveling at the speed of equal sign conditions of formula (1).

SUMMARY OF THE INVENTION

Then, an object of the present invention is to provide a method of not reducing a range and spatial resolution, being able to perform fluctuation correction processing, and accelerating traveling speed. In addition, another object of the present invention is to provide a method of being able to perform multi-look processing without reducing resolution.

In order to solve these problems, the present invention is characterized in a synthetic aperture sonar which has an actual aperture array divided into two or more verniers, comprising transmitting and receiving means for transmitting and receiving an acoustic signal from each of the verniers whenever the synthesis aperture sonar travels a fixed distance, and cross correlation processing means which performs cross correlation processing of the acoustic signal that are transmitted from and received by two verniers and overlap before and after the traveling of the fixed distance.

According to the present invention, it becomes possible not to reduce a range and spatial resolution, to perform fluctuation correction processing, and to accelerate traveling speed.

Moreover, another aspect of the present invention is characterized in a synthetic aperture processing method which has an actual aperture array divided into two or more verniers, comprising a transmission and reception step of transmitting and receiving an acoustic signal from each of the verniers whenever the synthesis aperture sonar travels a fixed distance, and a cross correlation processing step of performing cross correlation processing of acoustic signals that are transmitted from and received by two verniers and overlap before and after the traveling of a fixed distance.

According to other aspects of the present invention, the same effectiveness as that of the present invention described above are demonstrated.

DESCRIPTION OF THE PREFERRED EMBODIMENT

Figure 1:
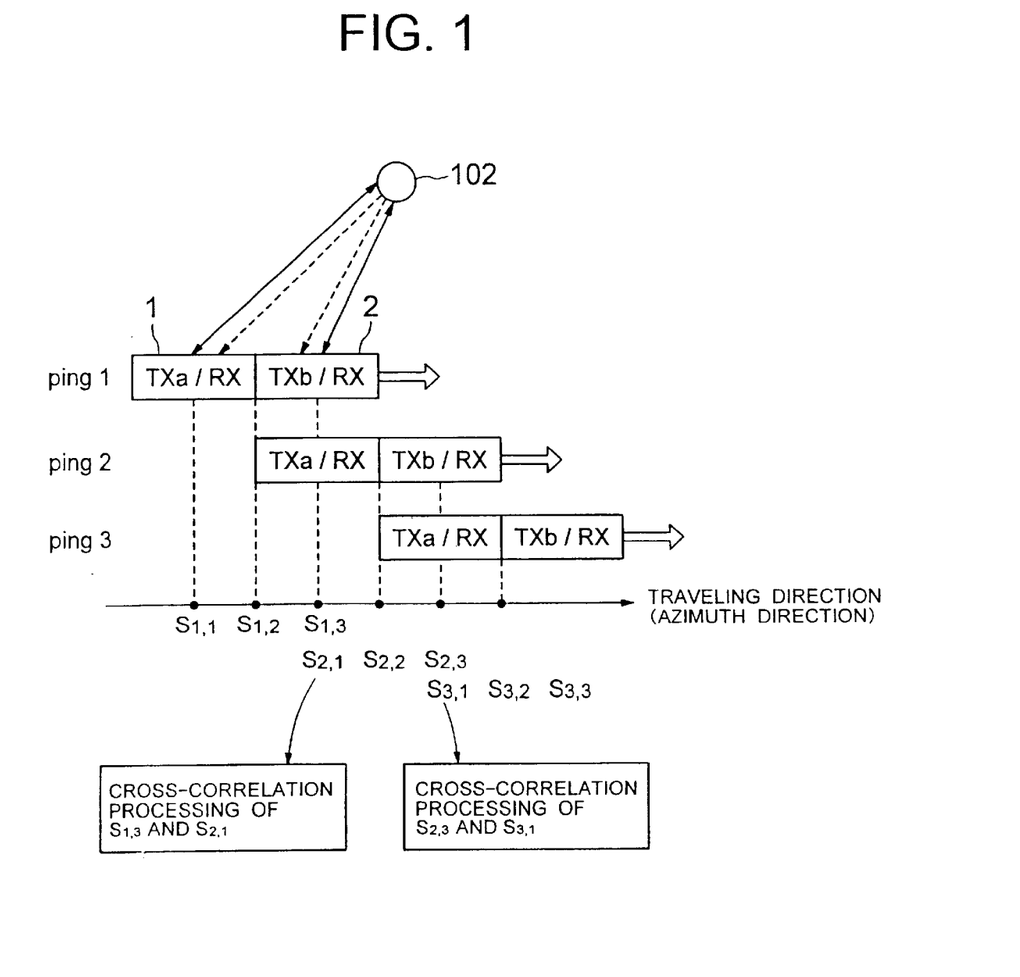
FIG. 1 is a drawing showing the basic principle of the best embodiment of a synthetic aperture sonar according to the present invention.

Hereafter, embodiments of the present invention will be described with referring to attached drawings. In addition, although a case of two verniers will be described below, it is expectable that the same effectiveness is also demonstrated in a case of two or more division. FIG. 1 is a drawing showing the basic principle of the best embodiment of a synthetic aperture sonar according to the present invention. With referring to the figure, an actual aperture array of the synthetic aperture sonar is divided into a rear vernier 1 and a front vernier 2. Then, both the rear vernier 1 and the front vernier 2 are equipped with a transmitting and receiving function respectively.

Figure 7A:
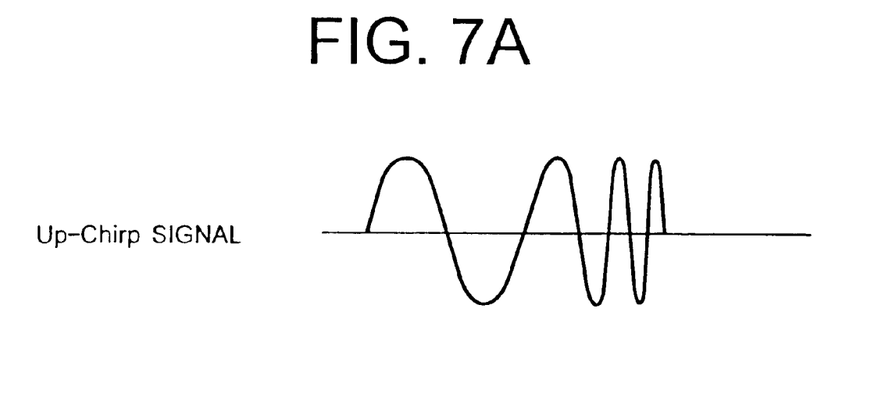
FIGS. 7A and 7B are waveform charts of examples of an Up-Chirp signal and a down-Chirp signal.
Figure 7B:
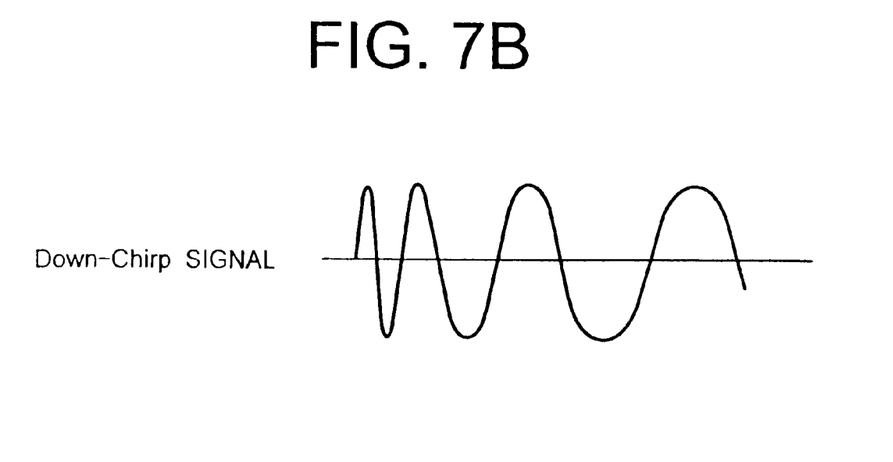

Moreover, as for transmission, two kinds of transmission waveforms separable by reception processing, for example, an Up-Chirp and a down-Chirp in LFM, and different frequency bands in PCM are prepared. FIGS. 7A and 7B are waveform charts of examples of an Up-Chirp signal and a down-Chirp signal. As shown in FIG. 7A, the Up-Chirp signal means a frequency modulation signal whose frequency increases gradually, and as shown in FIG. 7B, the down-Chirp signal means a frequency modulation signal whose frequency decreases gradually. In addition, let the transmission waveforms that are prepared be Wa(t) and Wb(t).

Figure 4:
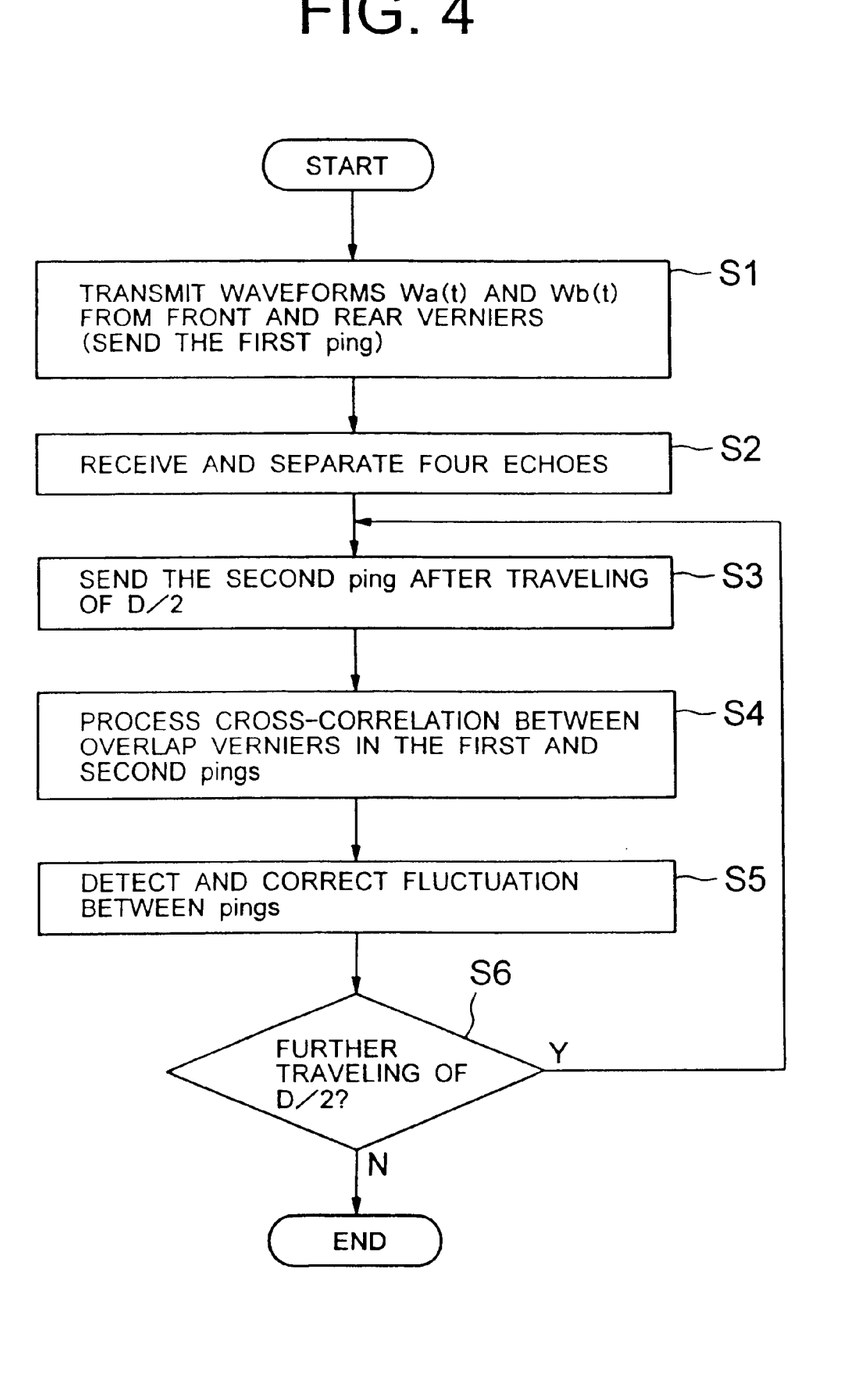
FIG. 4 is a flowchart showing the operation of this synthetic aperture sonar.

Next, the operation of a synthetic aperture sonar will be described with referring to FIGS. 1 and 4. FIG. 4 is a flowchart showing the operation of the synthetic aperture sonar. In a first ping (ping 1), a rear vernier 1 transmits a waveform Wa(t), and a front vernier 2 transmits a waveform Wb(t) almost simultaneously (S1 in FIG. 4). Then, two kinds of acoustic signals Wa(t) and Wb(t) that are transmitted are reflected by the detection target 102 which exists underwater, and return to the actual aperture array almost simultaneously as echoes. At this time, two kinds of waveforms Wa(t) and Wb(t) are added.

Then, respective verniers 1 and 2 perform reception and separation processing of input signals (namely, echoes of two waveforms added) (S2 in FIG. 4). Generally, reception means consists of a preamp, a band pass filter, an analog to digital (A/D) transducer, etc. Generally, as for waveform separation processing, a matched filter (delay line matching filter) etc. is used. In the case of the present invention, by correlation processing between the input signals and the replica (duplicate) signals of respective transmission waveforms Wa(t) and Wb(t), it becomes possible to separate the added signals. The transmission waveform W1(t) and the echo of W2(t) are independently separated by reception and separation processing. Two kinds of echoes can be obtained from one vernier, and hence four kinds of echoes can be obtained from the front and rear verniers.

Then, in a second ping (ping 2), the sonar travels D/2 and the same transmission and reception processing is repeated (S3 in FIG. 4). However, by the influence of platform fluctuation, the immeasurable fluctuation error component is included in the distance relation between each vernier center and the detection target 102. Then, in order to detect the fluctuation error between the first ping and second ping, cross correlation processing between the transmission and reception signal of the front vernier 2 in the first ping and the transmission and reception signal of the rear vernier 1 in the second ping is performed (S4 in FIG. 4). In consequence, a correlation peak is detected at the time lag ($\tau = c \cdot \delta$) proportional to the fluctuation deviation amount $\delta$ between the first and second pings. The fluctuation error component between both signals is removed by correcting the second ping input signal with using the time delay component and phase component equivalent to this time lag (S5 in FIG. 4).

A series of transmission and reception signals in which a ping fluctuation error component is not included can be obtained by repeating the above pings and fluctuation correction (in case of Y at S6 in FIG. 4). Then, after a required number of transmission and reception signals are obtained (in case of N at S6 in FIG. 4), a synthetic aperture processing image can be obtained by performing usual azimuth compression processing. Consequently, since two independent synthetic aperture images of the transmission waveforms Wa(t) and Wb(t) are obtained, these two images are added to become a final synthetic aperture image.

Figure 2:
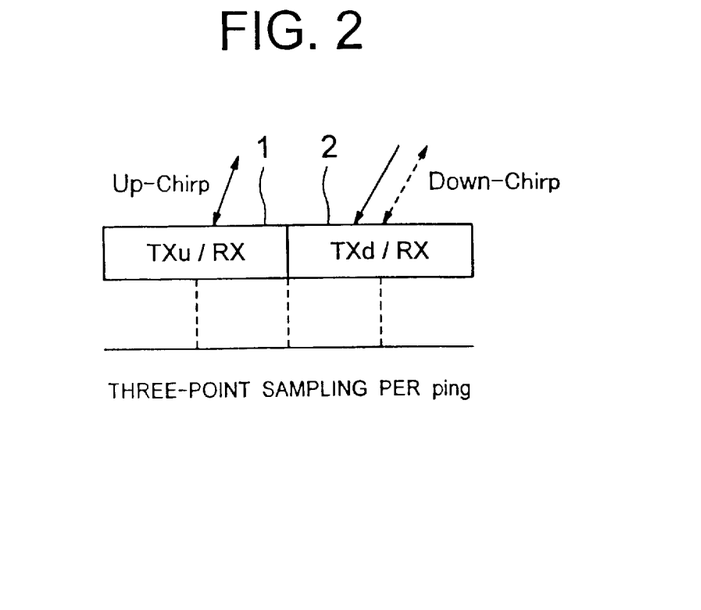
FIG. 2 is an explanatory diagram of operation of this synthetic aperture sonar.
Figure 3A:
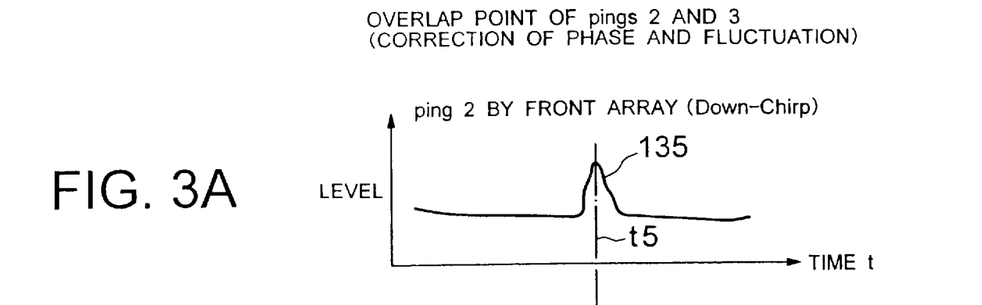
FIGS. 3A and 3B are explanatory diagrams of operation of this synthetic aperture sonar.
Figure 3B:
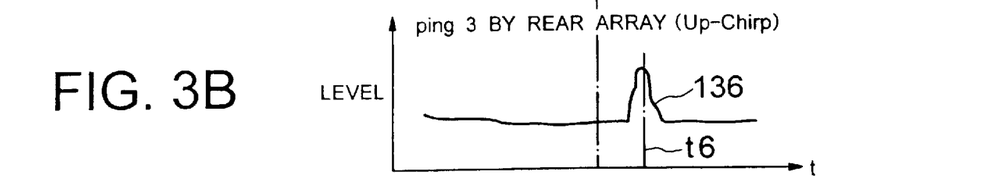

Namely, as shown in the explanatory diagrams of operation of the synthetic aperture sonar that are shown in FIGS. 2 and 3, four echoes are obtained by the rear vernier 1 and front vernier 2 transmitting the waveform Wa(t) (an Up-Chirp signal as an example), and the waveform Wb(t) (a down-Chirp signal as an example) almost simultaneously, and receiving and separating their echoes. From the relation among the above-mentioned Displaced Phase Centers, these four echoes are phase-equivalent to transmission and reception signals at the middle point of the rear vernier 1, the middle point of the actual aperture array, and the middle point of the front vernier 2. In consequence, it becomes possible to realize the three-point space sampling with one-time ping, and spatial resolution becomes D/4 that is twice as many as that of usual synthetic aperture processing.

In addition, FIGS. 3A and 3B show the relation between reception time t5 of a signal 135, which the front array 2 in a ping 2 receives, and reception time t6 of a signal 136, which the rear array 1 receives. By taking correlation between these signals 135 and 136, it becomes possible to compute time delay and phase fluctuation, and to perform phase and fluctuation correction.

Moreover, in comparison with conventional vernier processing, according to the present invention, an independent transmission and reception signal of the front vernier 2 can be obtained. Therefore, also in the case that the sonar travels D/2 and a second ping is performed, the verniers overlapped between the first and second pings (namely, the transmission and reception of the front vernier 2 in the first ping and the transmission and reception of the rear vernier 1 in the second ping) are formed. Therefore, the detection and correction of fluctuations between pings can be attained by performing cross correlation processing among these verniers to overlap. Consequently, it becomes possible to simultaneously realize all of the rapidity, which makes it possible to travel D/2 per ping, the high resolution that makes a spatial resolution be D/4, and the fluctuation correction function by the overlap method.

Moreover, the addition of two independent synthetic aperture images from the transmission waveforms Wa(t) and Wb(t) is equivalent to performing two-look of multi-look processing. Small spot (speckle) noise in the synthetic aperture images is reduced by multi-look processing, and hence, a higher-quality image can be obtained.

Figure 5:
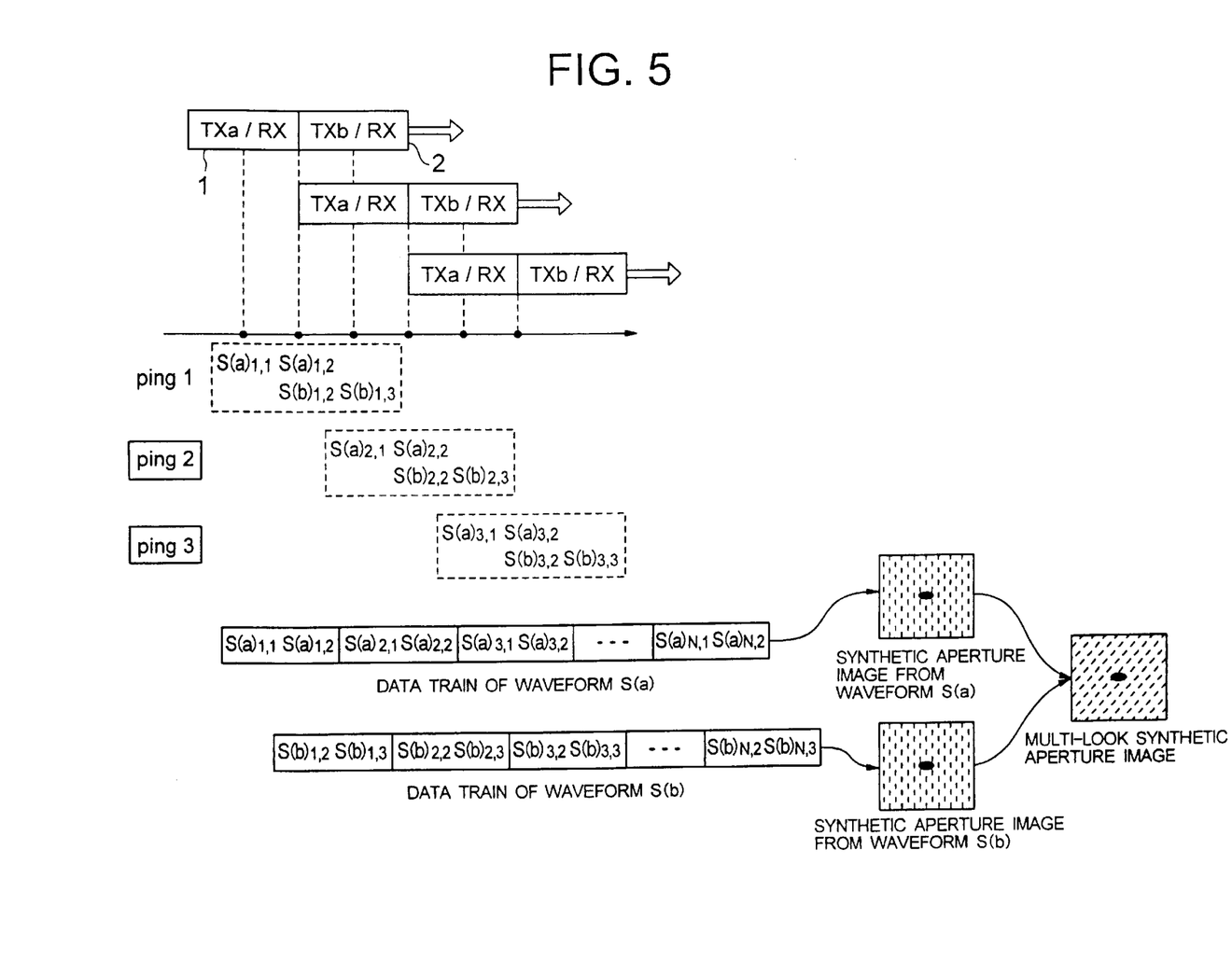
FIG. 5 is an explanatory diagram of operation of two-look of multi-look processing.

Next, the outline of two-look of multi-look processing will be described. FIG. 5 is an explanatory diagram showing the operation of two-look of multi-look processing. Now let an input signal in the rear array 1 be S(a) and let an input signal in the front array 2 be S(b). Then, input signals in the rear array 1 become S(a) 1,1 and S(a) 1, 2 in ping 1, and S(a) 2, 1 and S(a) 2, 2 in ping 2, and S(a) 3, 1 and S(a) 3, 2 in ping 3. Similarly to the above, generalized input signals become S(a) N, 1 and S(a) N, 2 in ping N (N is a positive integer). A synthetic aperture image by an waveform Wa is obtained from the data train of this input signal S(a).

Similarly, input signals in the front array 2 become S(b) 1, 2 and S(b) 1, 3 in ping 1, and S(b) 2, 2 and S(b) 2, 3 in ping 2, and S(b) 3, 2 and S(b) 3, 3 in ping 3. Similarly to the above, generalized input signals become S(b) N, 2 and S(b) N, 3 in ping N (N is a positive integer). A synthetic aperture image by an waveform Wb is obtained from the data train of this input signal S(b).

Then, a multi-look synthesis aperture image is obtained by adding the synthetic aperture image by S(a) to the synthetic aperture image by S(b).

Embodiments

Figure 6:
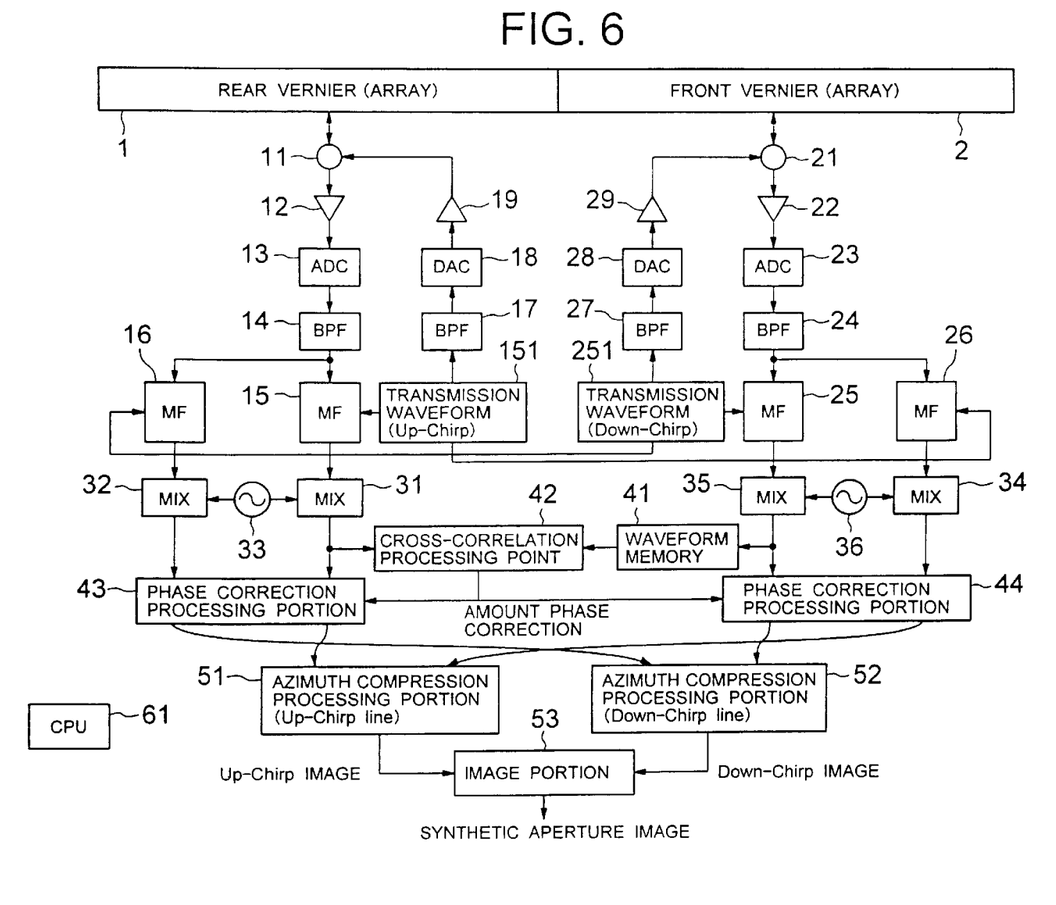
FIG. 6 is a block diagram of an example of this synthetic aperture sonar.

FIG. 6 is a block diagram of an example of a synthetic aperture sonar according to the present invention. In addition, the same numerals will be assigned to parts corresponding to those in FIG. 1, and the description on them will be omitted. First, a first embodiment will be described. With referring to FIG. 6, the synthetic aperture sonar consists of the rear vernier 1 and front vernier 2. Then, a transmission and reception portion is arranged at each trailing stage of the rear vernier 1 and front vernier 2. Furthermore, fluctuation-correcting portions (phase correcting portions) 43 and 44 are arranged in the form of bonding these, and azimuth-compressing portions 51 and 52 are arranged in trailing stages thereof.

Reference numeral 11 is a transmission and reception switching circuit, which suitably switches the connection of the rear vernier 1 and a subsequent circuit. A portion after reference numeral 19 denotes a rear vernier transmission-processing portion. Reference numeral 19 denotes a power amplifier, reference numeral 18 denotes a digital to analog converter (DAC), reference numeral 17 denotes a digital band pass filter (BPF), and reference numeral 151 denotes a transmission waveform forming portion, which generates and outputs a digital waveform of an Up-Chirp signal. A portion after reference numeral 12 is a rear vernier reception-processing portion. Reference numeral 12 denotes a preamplifier, reference numeral 13 denotes an analog-to-digital converter (ADC), and reference numeral 14 denotes a digital band pass filter (BPF). A matched filter portion (MF) 15 using the Up-Chirp signal uses an Up-Chirp transmission waveform generated in the transmission waveform-forming portion 151 as a replica signal. A matched filter 16 using the down-Chirp signal uses the down-Chirp transmission waveform generated in the transmission waveform-forming portion 251 of the front vernier 2 as a replica signal.

The input signals separated by the matched filters 15 and 16 are converted into base band signals in the mixing portions (MIX) 31 and 32. Here, the carrier tone signal fc(t) generated by an oscillator 33 is integrated, is given low pass filtering, and is given decimation respectively.

Reference numeral 21 is a transmission and reception switching circuit 21, which switches the connection of the front vernier 2 and a subsequent circuit suitably. A portion after reference numeral 29 denotes a front vernier transmission-processing portion. Reference numeral 29 denotes a power amplifier, reference numeral 28 denotes a digital to analog converter (DAC), reference numeral 27 denotes a digital band pass filter (BPF), and reference numeral 251 denotes a transmission waveform forming portion, which generates and outputs a digital waveform of a down-Chirp signal. A portion after reference numeral 22 is a front vernier reception-processing portion. Reference numeral 22 denotes a preamplifier, reference numeral 23 denotes an analog-to-digital converter (ADC), and reference numeral 24 denotes a digital band pass filter (BPF). A matched filter portion (MF) 25 using the down-Chirp signal uses a down-Chirp transmission waveform generated in the transmission waveform-forming portion 251 as a replica signal. A matched filter portion (MF) 26 using the Up-Chirp signal uses an Up-Chirp transmission waveform generated in the transmission waveform-forming portion 151 as a replica signal.

The input signals separated by the matched filters 25 and 26 are converted into base band signals in the mixing portions (MIX) 34 and 35. Here, the carrier tone signal fc(t) generated by an oscillator 36 is integrated, is given low pass filtering, and is given decimation respectively.

A waveform memory 41 inputs the down-Chirp signal of the front vernier 2, and has an output to the cross correlation-processing portion 42. The cross correlation-processing portion 42 inputs an output of the waveform memory 41 and a rear vernier Up-Chirp signal, and outputs processing result to the phase correction processing portions 43 and 44. The phase correction processing portions 43 and 44 input the outputs of respective matched filters and outputs from counter parts' phase correction processing portions, and outputs the processing result of the Up-Chirp signal to an azimuth compression processing portion 51, and outputs the processing result of the down-Chirp signal to an azimuth compression processing portion 52.

Then, the outputs of the azimuth compression processing portions 51 and 52 are given the synthetic processing in an imaging portion 53 for a final synthetic aperture image to be obtained. In addition, a CPU (Central Processing Portion) 61 controls the operation of each portion.

Next, the operation of a synthetic aperture sonar will be described with referring to FIG. 6. First, transmission signal forming portions 151 and 251 generate and output respective transmission waveforms almost simultaneously. Next, as for the transmission signal, after the components outside a predetermined signal band are suppressed by BPF 17 and 27, are converted into analog signals by DACs 18 and 28, furthermore are amplified to a predetermined level by power amplifiers 19 and 29, and are outputted to respective verniers through transmission and reception switching circuits 11 and 21. Each vernier converts the inputted electric signal into an acoustic signal, and radiates it to underwater simultaneously. At this time, since the vernier is a linear array, the acoustic signal radiated has space directivity.

Each acoustic signal outputted from two verniers is propagated underwater and is reflected by the detection target 102, and returns to each vernier as an echo. At this time, two transmission waveforms are added. The echoes are given acoustoelectric conversion in respective verniers, and are outputted to the transmission and reception switching circuits 11 and 21, which output the echoes to the reception processing portions 12 and 22 and following stages. Input signals are amplified to a predetermined level by preamplifiers 12 and 22, and are given analog-to-digital conversion by ADCs 13 and 23, and components outside a signal band are suppressed by BPFs 14 and 24. After that, input signals are divided into two signals respectively, the input signal of the rear vernier 1 is outputted to the matched filters 15 and 16, and the input signal of the front vernier 2 is to the matched filter 25 and 26 in parallel.

The matched filter 15 of the rear vernier 1 performs the processing of extracting the Up-Chirp component of the input signal, and hence, performs cross correlation processing between the input signal and a replica signal that is the transmission waveform in the rear vernier 1. Similarly, the matched filter 16 performs the processing of extracting the down-Chirp component of the input signal, and hence, performs cross correlation processing between the input signal and a replica signal that is the transmission waveform in the rear vernier 1. Similarly, also the matched filters 25 and 26 of the front vernier 2 extract Up-Chirp/down-Chirp signals from an input signal respectively.

Since each signal separated by matched filters 15, 16, 25, and 26 is a narrow-band waveform signal with a center frequency fc, the decimation of data is performed after the mixing portions 31, 32, 34, and 35 normalizes this signal with 0 Hz as a center. Consequently, signal processing loads in subsequent stages are reduced.

The waveform memory 41 stores a down-Chirp reception waveform of the front vernier 2 obtained in the last ping. The cross correlation processing portion 42 performs cross correlation processing between the waveform recorded on the waveform memory 41 and the Up-Chirp received waveform in the rear vernier 1 obtained by this ping, and detects lag time from which a correlation peak is obtained. The lag time that is obtained is outputted to the phase correction processing portions 43 and 44 in parallel as a phase correction amount. Then, the information in the waveform memory 41 is rewritten to the down-Chirp reception waveform in the front vernier in this ping.

The phase correction processing portions 43 and 44 perform the operation of time shift, which is equivalent to the lag time obtained in the cross correlation processing portion 42, and phase shift for each reception waveform. Consequently, since the time and phase shift components between the last and present pings are removed from an input signal, the fluctuation correction is performed.

The input signal after the fluctuation correction is performed is outputted to the azimuth compression processing portions 51 and 52 for every Up-Chirp signal and down-Chirp signal, and the same azimuth compression as the usual synthetic aperture processing is performed. Consequently, since two independent images corresponding to the Up-Chirp and down-Chirp signals are obtained to the same map, it is expectable to reduce a small spot noise and the like by performing addition and the like in the imaging portion 53. Operation after this fluctuation correction is the above described two-look of multi-look processing.

Next, other embodiments will be described with reference to FIG. 6. First, a second embodiment will be described. The Up-Chirp signal is transmitted by the rear vernier 1, and the down-Chirp signal is transmitted by the front vernier 2 in FIG. 6. However, on the contrary, it is conceivable to transmit a down-Chirp signal in the rear vernier 1 and to transmit an Up-Chirp signal in the front vernier 2, respectively. In this case, the waveform memory 41 stores a front vernier Up-Chirp signal, and the cross correlation-processing portion 42 performs cross correlation processing with a rear vernier down-Chirp signal.

Next, a third embodiment will be described. As the third embodiment, it is conceivable to use a code modulation waveform in which a frequency changes stepwise instead of an LFM waveform such as Up-Chirp or down-Chirp signal as a transmission and reception signal. In this case, matched filter processing is performed to a replica signal with using the transmission waveform concerned.

Next, a fourth embodiment will be described. As the fourth embodiment, it is conceivable to use a narrow band PCM waveform that has different frequency bands instead of an LFM waveform such as Up-Chirp or down-Chirp signal as a transmission and reception signal. In this case, although the matched filter of the reception-processing portion becomes unnecessary, a space replica waveform in the azimuth direction in subsequent azimuth compression processing does not become a usual chirp waveform. Therefore, in this case, the space replica waveform obtained at the frequency used is expected and computed beforehand, and is applied to the matched filter processing.

Next, a fifth embodiment will be described. As the fifth embodiment, it is conceivable to arrange the mixing portions 31, 32, 34, and 35 in preceding stages of the matched filters 15, 16, 25, and 26 respectively. In this case, it is necessary to use a signal which is given the same mixing processing to a transmission waveform, or a low data rate signal with 0 Hz as a center that is equivalent to it, as a replica waveform of each matched filter.

Subsequently, a sixth embodiment will be described. As the sixth embodiment, a system is conceivable, the system that has only one azimuth compression processing portion and generates a synthetic aperture image only corresponding to one transmission waveform. In this case, an azimuth compression-processing portion is either 51 or 52, and the imaging portion 53 is also unnecessary.

Next, a seventh embodiment will be described. As the seventh embodiment, a system is conceivable, the system where another vernier starts transmission consecutively just after one vernier complete transmission instead of transmitting two transmission signals almost simultaneously. In this case, it can be also seen that the transmission waveform is not a summation of Up-Chirp and down-Chirp signals, but is rather a tandem (series) transmission waveform of the Up-Chirp and down-Chirp. As for a processing system, a sonar having the almost same structure as that in FIG. 6 can perform processing, but it is necessary to consider that a space replica waveform in azimuth compression processing does not become a usual chirp waveform.

The present invention is a synthetic aperture sonar which has an actual aperture array divided into two or more verniers, comprising transmitting and receiving means for transmitting and receiving an acoustic signal from each of the verniers whenever the synthesis aperture sonar travels a fixed distance, and cross correlation processing means which performs cross correlation processing of the acoustic signal that are transmitted from and received by two verniers and overlap before and after the traveling of the fixed distance, and hence, it becomes possible without reducing a range and spatial resolution to perform fluctuation correction processing, and to accelerate traveling speed.

Concretely, first effectiveness is the point that it is possible to obtain a synthetic aperture image with high resolution without decreasing a traveling speed. This is because it is possible to realize fluctuation correction between pings with the sonar traveling D/2 per ping, and to avoid the degradation of resolution by fluctuations, by generating a front vernier transmission and reception signal and performing fluctuation correction with using the overlap method. In addition, it is because spatial resolution is also improved to D/4, which is twice as much as usual resolution since vernier division processing is performed. In consequence, it is possible to obtain a synthetic aperture image that has high resolution and is given the fluctuation correction while having a mapping efficiency (traveling speed and range) and actual aperture array length that are equivalent to the usual synthetic aperture processing.

A second effectiveness is the point that a plurality of independent synthetic aperture images can be obtained without reducing resolution. This is because the plurality of independent synthetic aperture images is separated by reception processing with using two or more kinds of transmission signals, and is given the synthetic aperture processing independently. For this reason, it is not necessary to divide and shorten synthetic aperture length like the usual multi-look processing, and therefore, the deterioration of resolution can be avoided.

A third effectiveness is the point that it is possible to prevent the enlargement of an apparatus. This is because the vernier division method is one of methods that are simplest and have smallest processing loads among presently known high resolution methods, and is realizable in a scale of a small apparatus in comparison with other complicated and advanced methods. Similarly, this is because the overlap method is one of methods that are simplest and have smallest processing loads among presently known fluctuation correction methods, and is realizable in a scale of a small apparatus in comparison with other complicated and advanced methods.

What is claimed is:

1. A synthetic aperture sonar which has an actual aperture array divided into two or more verniers, comprising transmitting and receiving means for transmitting and receiving an acoustic signal from each o said verniers whenever said synthesis aperture sonar travels a fixed distance, and cross correlation processing means which performs cross correlation processing of the acoustic signals that are transmitted from and received by two verniers and overlap before and after the traveling of the fixed distance.

2. The synthetic aperture sonar according to claim 1, further comprising azimuth compression processing means for performing azimuth compression processing of an acoustic signal received by each of said verniers whenever the synthetic aperture sonar travels a fixed distance.

3. The synthetic aperture sonar according to claim 1, wherein acoustic signals transmitted from said verniers are constituted from acoustic signals separable into a plurality of signals by reception processing.

4. The synthetic aperture sonar according to claim 1, wherein acoustic signals from said verniers are transmitted almost simultaneously.

5. The synthetic aperture sonar according to claim 2, wherein a synthetic aperture processing image of a transmission signal from each of said verniers that is independent is obtained by said azimuth compression processing means.

6. The synthetic aperture sonar according to claim 5, further comprising an imaging portion adding synthetic aperture processing images from said respective verniers that are obtained by said azimuth compression processing means.

7. The synthetic aperture sonar according to claim 1, wherein each vernier between said verniers that are adjoining transmits and receives a signal different from each other.

8. The synthetic aperture sonar according to claim 1, wherein another vernier starts transmission just after one vernier between said verniers that are adjoining completes transmission.

9. A synthetic aperture processing method which has an actual aperture array divided into two or more verniers, comprising a transmission and reception step of transmitting and receiving an acoustic signal from each of said verniers whenever said synthesis aperture sonar travels a fixed distance, and a cross correlation processing step of performing cross correlation processing of acoustic signals that are transmitted from and received by two verniers and overlap before and after traveling of a fixed distance.

10. The synthetic aperture processing method according to claim 9, further comprising an azimuth compression processing step of performing azimuth compression processing of an acoustic signal received by each of said verniers whenever the synthetic aperture sonar travels a fixed distance.

11. The synthetic aperture processing method according to claim 9, wherein acoustic signals transmitted from said verniers are constituted from acoustic signals separable into a plurality of signals by reception processing.

12. The synthetic aperture processing method according to claim 9, wherein acoustic signals from said verniers are transmitted almost simultaneously.

13. The synthetic aperture processing method according to claim 10, wherein a synthetic aperture processing image of a transmission signal from each of said verniers that is independent is obtained by said azimuth compression processing step.

14. The synthetic aperture processing method according to claim 13, further comprising an imaging step of adding synthetic aperture processing image from said respective verniers that are obtained by said azimuth compression processing step.

15. The synthetic aperture processing method according to claim 9, wherein each vernier between said verniers that are adjoining transmits and receives a signal different from each other.

16. The synthetic aperture processing method according to claim 9, wherein another vernier starts transmission just after one vernier between said verniers that are adjoining completes transmission.

* * * * *